Patented Jan. 18, 1949

2,459,369

UNITED STATES PATENT OFFICE 2,459,369

METHOD OF EXTRACTING RUBBER FROM PLANTS

Howard Tint and Charles W. Murray, Salinas, Calif., assignors to the United States of America as represented by the Secretary of Agriculture No Drawing. Application January 13, 1947, Serial No. 721,829

10 Claims. (Cl. 260—818)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to an improved process for the extraction of rubber from various rubber-bearing shrubs and vines. It is especially applicable to the extraction of rubber from the guayule plant, *Parthenium argentatum* Gray, in which connection it will be described in greater detail. The procedure is rapid and economical and results in a rubber product of physical quality far superior to that at present extracted in the industry by conventional methods, and which is, in effect, a new product in the industry.

Modern commercial methods of extracting rubber from plants, such as guayule, involve mechanically grinding or crushing the shrub and then milling it in the presence of water, with the consequent agglomeration of the rubber into small pellets, or "worms," which separate from the remaining portions of the plant by floating on the water. The efficacy of this method, particularly as to the quantity of product obtained, depends upon the condition or state of the rubber in the shrub. It has been demonstrated that guayule carries its rubber in latex, colloidally dispersed in a layer of cells overlying the cambium and in the living cells of all the permanent tissues. Before mechanical methods of extracting solid rubber may be successfully employed, the rubber in latex form must be coagulated into a solid condition prior to processing for extraction. In practice, therefore, it has been necessary to subject the plants to various field-sunning or drying treatments to effect reduction of moisture content and coagulation of the latex. These procedures are of necessity continually being modified to suit the particular environmental conditions under which the shrub is harvested or stored, and hence no fixed or universal method of drying or conditioning may be applied with equal effectiveness in all circumstances. Furthermore, in the drying or conditioning of whole shrub, it is difficult and sometimes impossible to secure uniform drying or coagulation of the latex simultaneously in all the tissues of the plant; and in the drying of cut or crushed material, finely divided rubber is exposed to the action of light, air and elevated temperatures, under which conditions rubber in guayule is known to deteriorate quite rapidly. Thus, according to the extremely variable conditions which obtain in the preparation of shrub for milling in the current commercial process for guayule rubber extraction, the resulting product shows corresponding variability in yield, composition and quality.

Rubber-bearing plants in general contain varying amounts of acetone-soluble substances, and guayule particularly is characterized by a relatively high content of these materials, described as "resins" in the industry. In the process of agglomerating rubber in the usual mechanical method of extraction, these materials become incorporated as impurities in the product. Along with other contaminating substances, such as fragments of fibers, cork, sand, and so forth, these non-rubber fractions constitute a relatively high percentage of the mass of the worms which are recovered in the flotation procedures of the present mechanical process of extraction. Certain scrubbing procedures in clean water, carried out upon the worms, serve to more or less effectively remove a large part of the grosser mechanically entrapped materials; on the other hand, the acetone-soluble fraction, present in the rubber-hydrocarbon in effect as a solid solution, is little affected by these washing treatments. Hence the conventional guayule product usually contains resins in the neighborhood of twenty to twenty-five percent (20 to 25%) of the dry weight of the rubber, the amount varying in relation to variety of shrub, season of harvest, pretreatment of shrub, and so forth.

Experience in handling crude rubber obtained by conventional extraction from guayule, has indicated that the quality of the product is in approximately direct relation to its acetone-soluble content. Where the resins in the crude are high, the resultant physical properties in both the crude and vulcanized states have almost invariably been poor, in contrast with corresponding properties of the better grades of plantation rubbers used as standards. Furthermore, the presence in the product of a large resin fraction is invariably associated with its early and rapid degradation during processing and storage, and it is evident that resinous guayule posseses the disadvantages associated with lack of resistance to deterioration, development of tackiness, and a tendency to excessive flow characteristics. These inferior physical properties have placed limitations upon the ease with which the product may be handled and stored, and further have restricted to a great extent the possible industrial applications open to its use.

The present invention provides an improved method of treating rubber-bearing plants, such as guayule, and the extraction of rubber therefrom, which minimizes or eliminates entirely some of the deficiencies and disadvantages outlined above which exist in the present-day commercial methods of extraction. In the practice of this improved method, the need for extensive shrub-preconditioning for latex coagulation is avoided, with the consequent minimization of the deterioration of the rubber content of the shrub, at no sacrifice to the yield of the product; and, further, whereby an improved product is obtained of substantially higher quality and vastly improved handling characteristics than has heretofore been obtainable. Furthermore, this method may be universally applied to shrubs from various sources and conditions and at various times in the year, being uninfluenced in regard to effectiveness by any seasonal or climatic effects upon the plants, providing thus a standard method of treatment leading to the production of a more uniform product.

According to the present invention, the shrub in a lush condition is taken directly from the field following harvesting. It is immediately defoliated by conventional methods of parboiling in water and trommelling for removal of leaves; and then, without any further delay, is disintegrated by grinding or crushing. The process of defoliation is an optional one. However, we prefer to defoliate, since previous experiences with the conventional method has indicated that certain leaf constituents may confer upon the product some inferior physical qualities.

The crushed material is then passed into a suitable vessel for solvent extraction of certain non-rubber constituents of the shrub, primarily the so-called resins. For this purpose a water-miscible solvent such as acetone is preferred. However, we do not limit ourselves to the use of this agent, since other organic solvents may be employed in a similar fashion; for example, ethyl alcohol, methyl alcohol, and so forth.

The treatment of the crushed shrub with the solvent is carried out for a sufficient time, with suitable agitation and with such replacement of the solvent as is necessary to insure more or less effective reduction and removal of the fraction soluble in the solvent. At the same time, the extraction of water by the same solvent effectively causes complete coagulation of any rubber in latex form remaining in the shrub following the crushing operation. The residual solvent is then removed quantitatively by washing the extracted shrub with water. The solvent may then be reclaimed by distillation procedures and the resins recovered for further processing and use as valuable by-products of the process.

The treated shrub, dispersed in water, is then fed to the conventional extraction mills for the further extraction and purification of the rubber by the conventional mechanical procedures, the preliminary treatment of the shrub having in no wise interfered with the agglomerability of the rubber coagula into worms in the usual manner.

For the continuous operation of a commercial extraction mill, the solvent treatment of the shrub and the concomitant recovery of the solvent and the resins may be carried out in a continuous fashion, the shrub passing directly from the crushing operation, through a continuous extractor, directly into the rubber extraction mills. At the same time, the removal by the solvent of a considerable fraction of the shrub mass permits the attainment of a greater mill capacity, based upon a given starting weight of shrub, than is possible in the present conventional extraction process.

The worms produced in accordance with the present invention yield, upon analysis, an acetone-soluble fraction of approximately five percent (5%), based upon the dry weight of the mill product. This is in decided contrast with the higher figure earlier mentioned for the conventional product obtained in the usual way. The newer worms offer a number of distinct advantages; they are lighter in color and have a lower specific gravity, floating more readily than the old-type resinous worms. For the latter reason, they are more quickly recoverable, thus facilitating the flotation operation. Furthermore, during drying and in storage in the crude state, they exhibit a markedly increased resistance to deterioration or tackiness. We believe this increased resistance of the worms to deterioration is due in a great measure to a corresponding resistance to air-oxidation, since many of the unsaturated resins which may act as oxidation catalysts are removed by the solvent extraction of the shrub, before they can effectively act in the oxidation of the rubber hydrocarbon during subsequent phases in the mechanical extraction and purification of the product.

Furthermore, the improved product of the present invention has additional improved properties during compounding and vulcanization and in the vulcanized state, as indicated in the following table, wherein the physical properties of guayule rubber, prepared according to this improved process, are compared with those of the usual type of product obtained from the same variety of shrub, prepared by the usual method of extracting ordinary resiniferous rubber. Also, by way of further contrast, the physical properties of a good grade of plantation smoked sheet are included. All samples were vulcanized to optimum cure on a standard test formula containing one hundred (100) parts of rubber, one (1) part captax, four (4) parts stearic acid, six (6) parts zinc oxide, and three and one-half (3½) parts sulphur. The two guayule rubbers were treated, in addition, prior to drying, each with one-half percent (½%) of an antioxidant, p—p', diphenyl phenylene diamine, which substance, however, has little or no activating properties which might affect the validity of the test results.

TABLE

Comparison of physical properties

| Rubber | Opt. cure time (min.) at 260° F. | Green tensile p. s. i. | Modulus at 500% elong. p. s. i. | Ultimate elongation (%) | Hardness | Permanent set | Tensile product 100 | Aged [2] tensile p. s. i. |
|---|---|---|---|---|---|---|---|---|
| Hevea [1] | 120 | 3,770 | 1,040 | 690 | 48 | 12 | 298 | 2,300 |
| Rubber from deresinated guayule shrub | 60 | 3,760 | 1,180 | 690 | 43 | 12 | 297 | 2,910 |
| Ordinary resinous guayule | 60 | 2,445 | 345 | 780 | 34 | 12 | 216 | 2,000 |

[1] Honduras smoked sheet, without antioxidant.
[2] Aged 72 hours in $O_2$ at 70° C. and 300 p. s. i. pressure.

From these results it is obvious that guayule rubber prepared by this improved process is a decidedly more resistant product, with elastic properties more nearly resembling plantation rubber, than the guayule rubber of the present-day process. The low resin content of the improved product, its resistance to degradation, and its adaptability to being produced with more or less uniform quality, make it an extremely satisfactory and useful one in the industry.

We recognize that one alternative procedure for producing a deresinated product is the solvent treatment of worms, after they are produced in the usual methods for mechanical extraction, as illustrated in United States Patent No. 1,753,185. However, the practice of rubber extraction following solvent treatment of the crushed or ground shrub, performed according to the improved process of the present invention, offers certain advantages not attained in the procedure utilizing solvent extraction of resins from the worms. In the first place, in our improved method, shrub may be processed directly in a lush condition, achieving complete latex coagulation without subjecting the rubber in the shrub to the deteriorating influences attending normal shrub preconditioning, a practice which must ordinarily be employed to secure adequate yields of worms by the conventional extraction method for subsequent deresination. Thus, the deterioration of the rubber before and during milling, and related worm-handling problems, are reduced to a minimum. Furthermore, the rubber, in the shrub in a crushed or ground state before milling, is distributed in a more finely dispersed condition and is more readily accessible to more complete solvent action than the tightly agglomerated pellets of rubber in the worm form. Also, the solvent treatment of the shrub more nearly approaches quantitative recovery of the resin fraction of the plants than does extraction of the worms, which bear only a portion of this fraction, and hence the former is a more efficient and economical practice.

Having thus described our invention, we claim:

1. A process of extracting rubber from guayule plants, comprising comminuting the green, lush, freshly harvested, defoliated guayule shrub and then subjecting the said comminuted, green, lush, freshly harvested, defoliated guayule shrub to extraction with a water-miscible organic solvent which dissolves the resins therein and not the rubber, removing the solvent, and thereafter removing the rubber from the shrub.

2. The process of claim 1 in which the organic solvent is acetone.

3. A process of extracting rubber from guayule plants, comprising subjecting the comminuted, green, lush, freshly harvested guayule shrub to extraction with a water-miscible organic solvent which dissolves the resins therein and not the rubber, removing the solvent, and thereafter removing the rubber from the so-treated shrub.

4. A process of obtaining rubber from guayule plants, comprising subjecting the comminuted, freshly harvested, undried guayule plants to extraction with a water-miscible organic solvent which dissolves the resins therein and not the rubber, removing the solvent, and thereafter removing the rubber from the so-treated plants.

5. The process of claim 4 in which the organic solvent is acetone.

6. The process of claim 4 in which the organic solvent is ethyl alcohol.

7. The process of claim 1 in which the organic solvent is ethyl alcohol.

8. The process of claim 3 in which the rubber is removed from the shrub by milling in water.

9. The process of claim 4 in which the rubber is removed from the shrub by milling in water.

10. A process of extracting rubber from guayule, comprising subjecting the comminuted, green, lush, freshly harvested, unmilled guayule shrub to extraction with a water-miscible organic solvent which dissolves the resins therein and not the rubber, and thereafter removing the rubber from the shrub by milling in water.

HOWARD TINT.
CHARLES W. MURRAY.

REFERENCES CITED

The following references are of record in the file of this patent:

UNITED STATES PATENTS

| Number | Name | Date |
|---|---|---|
| 741,256 | Lawrence | Oct. 13, 1903 |
| 814,407 | Stechow | Mar. 6, 1906 |
| 920,279 | Delafond | May 4, 1909 |
| 957,495 | Chute et al. | May 10, 1910 |